United States Patent [19]
Westover et al.

[11] Patent Number: 5,262,762
[45] Date of Patent: Nov. 16, 1993

[54] COMPUTER TERMINAL INCLUDING MULTI-POSITION ATTACHED KEYBOARD

[75] Inventors: Dwight G. Westover, Sierra Madre; Dickey J. Berry, La Verne, both of Calif.

[73] Assignee: Hughes-Avicom International, Inc., Glendora, Calif.

[21] Appl. No.: 907,883

[22] Filed: Jul. 2, 1992

[51] Int. Cl.⁵ .............................................. G09G 3/02
[52] U.S. Cl. ..................................... 345/168; 341/22; 400/682; 345/156
[58] Field of Search .............. 340/711, 700; 341/22, 341/20; 248/918, 917; 364/709.12; 400/682, 693; 361/382, 391, 392, 393

[56] References Cited

U.S. PATENT DOCUMENTS

| | | | |
|---|---|---|---|
| 4,379,429 | 4/1983 | Gubbe et al. | 248/918 |
| 4,667,271 | 5/1987 | Wilson | 361/391 |
| 5,040,760 | 8/1991 | Singer | 248/918 |
| 5,173,686 | 12/1992 | Fujihara | 340/700 |

Primary Examiner—Alvin E. Oberley
Assistant Examiner—Minsun Oh
Attorney, Agent, or Firm—Terje Gudmestad; Wanda K. Denson-Low

[57] ABSTRACT

An upright wall mountable or portable computer terminal (10) includes a keyboard (16) which can be moved to a number of locked positions, including stowed (flat) for fingerpoking, extended out in a typing position, lowered, angled and flipped over with the keyboard (16) inside. The keyboard (16) is supported by a mechanism (20) which extends from a frame (22) of the terminal (10) and includes a shaft (40) which rotatably supports an upper edge portion of the keyboard (16). Rack and pinion units (24) rotatably support the ends (40a) of the shaft (40) and enable rotation and up and down movement of the shaft (40) and thereby the keyboard (16) without skewing. A spring loaded latch (70) enables the keyboard (16) to be locked in a desired position with overforce breakaway.

19 Claims, 5 Drawing Sheets

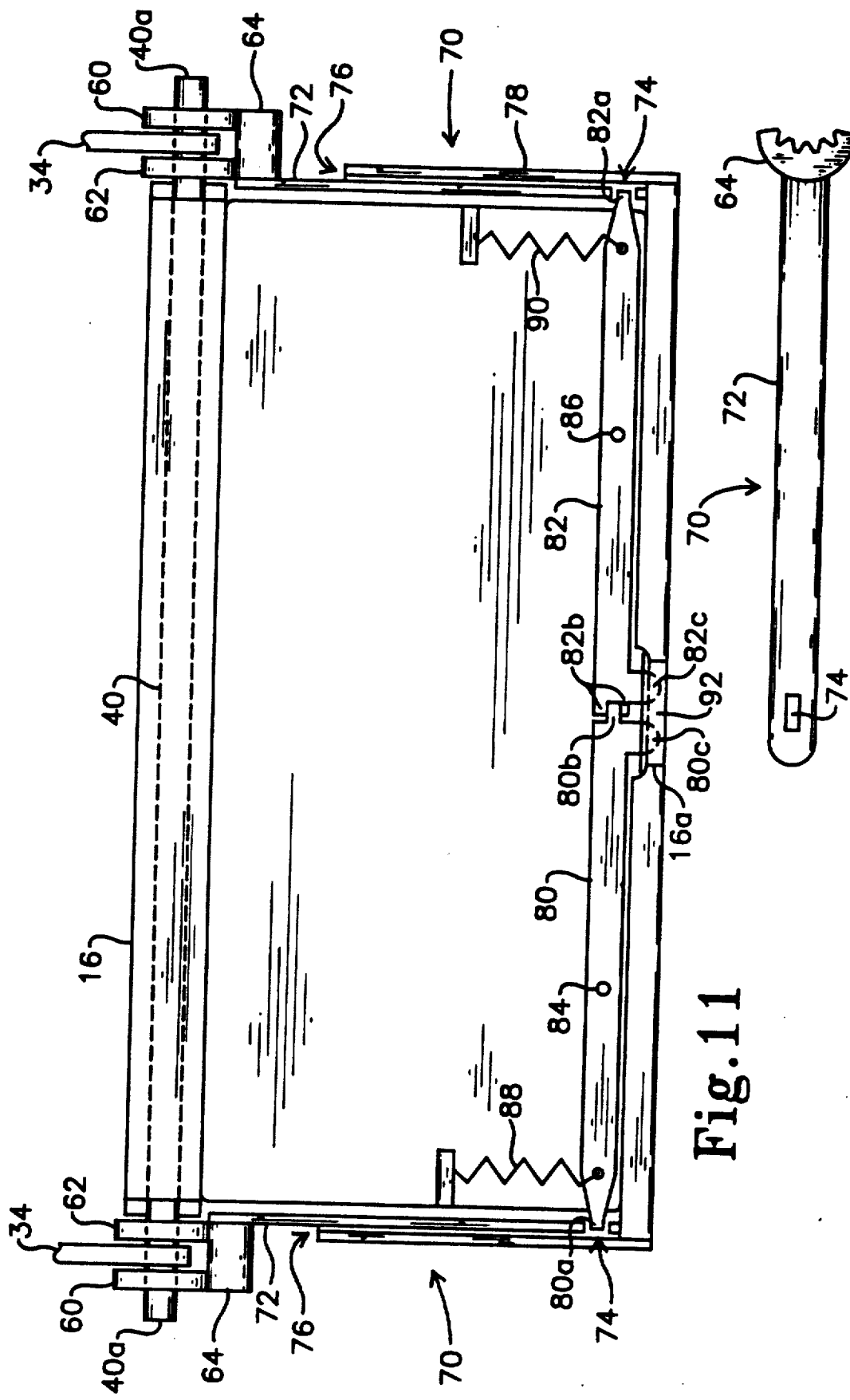

COMPUTER TERMINAL INCLUDING MULTI-POSITION ATTACHED KEYBOARD

BACKGROUND OF THE INVENTION

1. Field of the Invention

The present invention generally relates to the field of computers, and more specifically to a computer terminal including an attached keyboard which can be moved to a number of locked positions relative to a frame of the terminal.

2. Description of the Related Art

Computer terminals or monitors have conventionally included a cathode ray tube display screen and a keyboard which are fixedly mounted together in a frame or are separate units. More recently laptop computers have been introduced which include a flat liquid crystal display screen which is movable between an upright position for use and a stowed position for transport. An example of a commercially available laptop computer having a flip-up screen and a detachable keyboard is the Toshiba T6400, as described and illustrated in PC World magazine, March 1992, page 75.

Various applications, such as portable terminals for commercial aircraft cabin management systems, require that a portable computer terminal be usable when mounted upright on a wall, laid down flat on a desk or placed in the user's lap. A fixed keyboard cannot be comfortably and efficiently used in all of these positions.

SUMMARY OF THE INVENTION

An upright wall mountable or portable computer or terminal embodying the present invention includes a keyboard which can be moved to a number of locked positions, including stowed (flat) for fingerpoking, extended out in a typing position, lowered, angled and flipped over with the keyboard inside.

The keyboard is supported by a mechanism which extends from a frame of the terminal and includes a shaft which rotatably supports an upper edge portion of the keyboard. Rack and pinion units rotatably support the ends of the shaft and enable rotation and up and down movement of the shaft and thereby the keyboard without skewing. A spring loaded latch enables the keyboard to be locked in a desired position with overforce breakaway.

The computer terminal may be a conventional digital computer, or an electronic instrument such as for video or audio signal processing which requires a keyboard for data or control input.

The mechanism which supports the keyboard can be used for supporting objects other than keyboards for rotational movement about an axis which is transversely movable in a direction perpendicular to itself.

These and other features and advantages of the present invention will be apparent to those skilled in the art from the following detailed description, taken together with the accompanying drawings, in which like reference numerals refer to like parts.

DESCRIPTION OF THE DRAWINGS

FIG. 11 is a plan view of the keyboard illustrating the locking portion of the mechanism; and FIG. 12 is a plan view illustrating a latch member of the mechanism.

DETAILED DESCRIPTION OF THE INVENTION

A computer terminal 10 embodying the present invention is illustrated in FIGS. 1 to 7. The terminal 10 may be an upright wall mountable, portable, laptop or other type of digital computer. It may also be a remote terminal which communicates with a central processor on a time sharing basis. It may also be an electronic instrument such as for video or audio signal processing which requires a keyboard for data or control input.

The terminal 10 includes a casing or housing 12 which fixedly supports a display screen 14. In accordance with the invention, a keyboard 16 is attached to the housing 12, but is movable to and lockable in a variety of positions relative to the housing 12.

Figure 1:
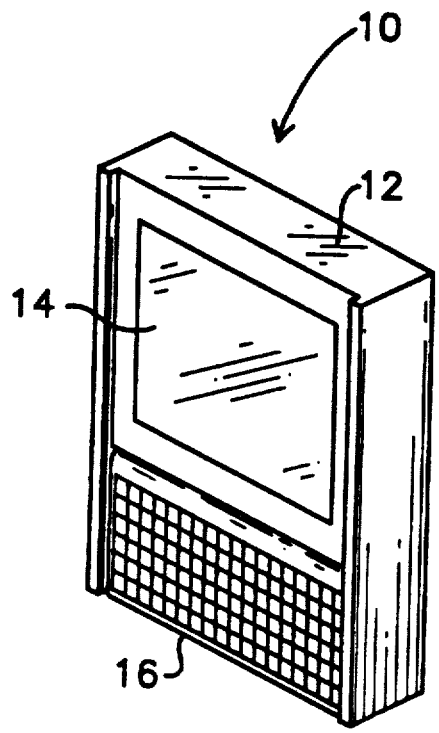
FIGS. 1 to 7 are simplified perspective views illustrating a computer terminal embodying the present invention including a keyboard which is locked in various positions relative to a frame of the terminal.
Figure 2:
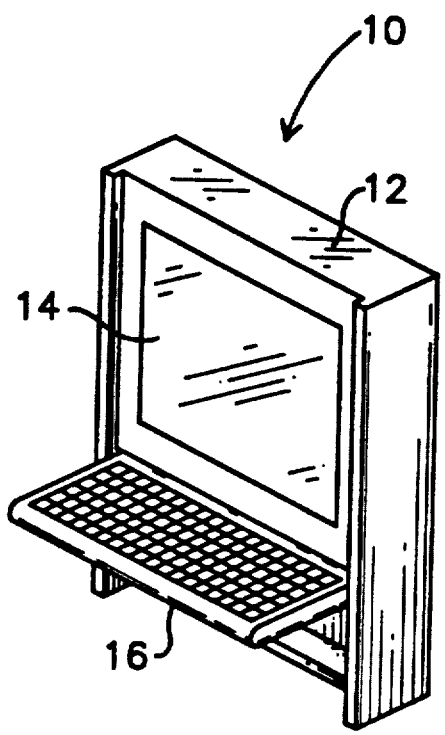
Figure 3:
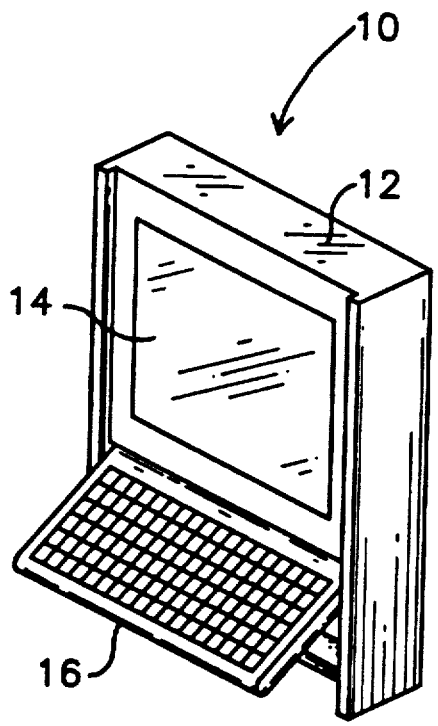
Figure 4:
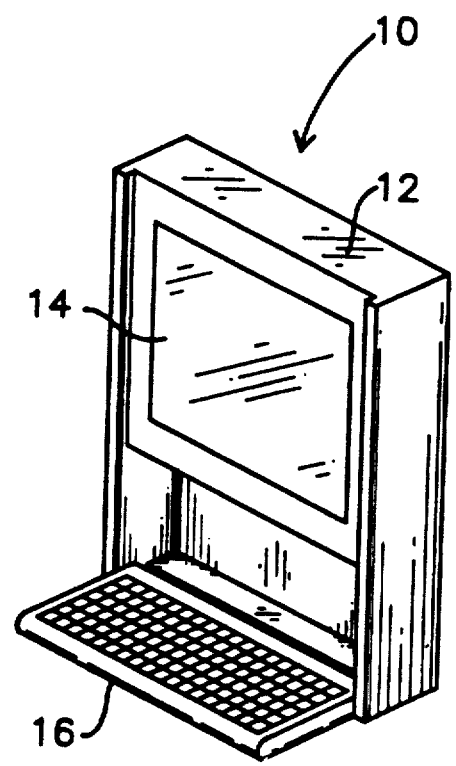

The range of positions which the keyboard 16 is movable to and lockable in are illustrated in FIGS. 1 to 7. In FIG. 1, the keyboard 16 is in an uppermost vertical position facing outwardly. This position is advantageous where the terminal 10 is mounted upright on a wall at eye level, since it facilitates "keypoking". In FIG. 2, the keyboard 16 is in an uppermost horizontal position. In FIG. 3, the keyboard is rotated downwardly about its upper edge to an inclined position relative to the housing 12. In FIG. 4, the keyboard 16 is in a lowermost horizontal position.

Figure 5:
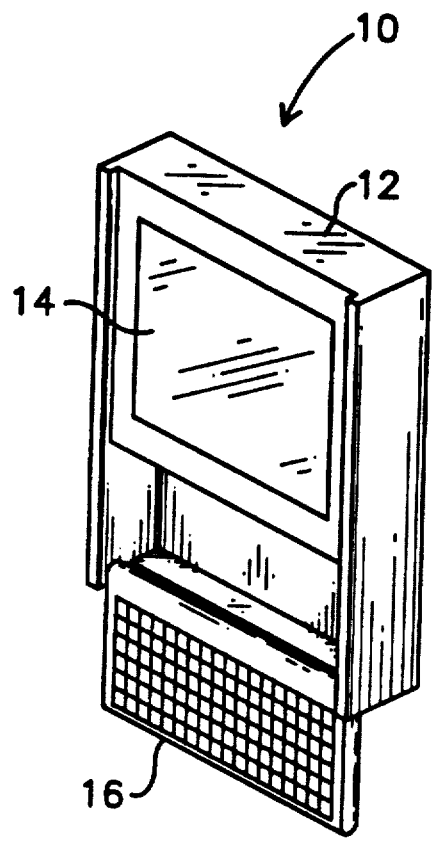
Figure 6:
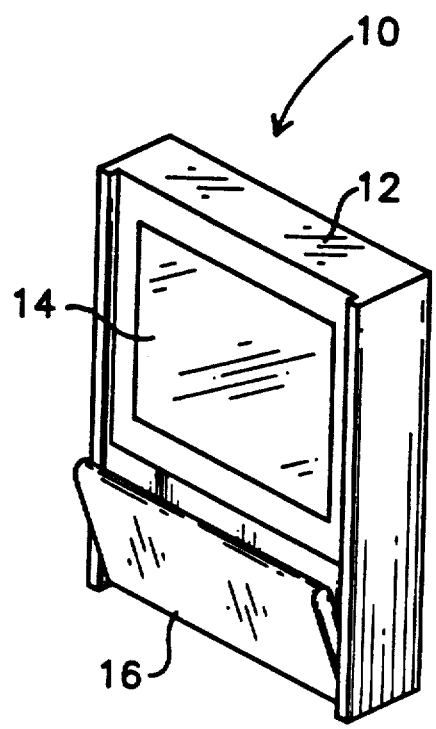
Figure 7:
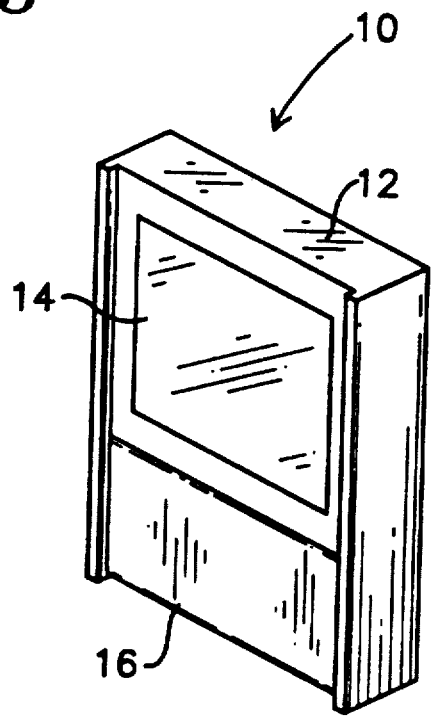

In FIG. 5, the keyboard 16 is rotated downwardly from the position of FIG. 4 to a lowermost vertical position. The keyboard 16 can be rotated upwardly from the position of FIG. 5 through an intermediate position illustrated in FIG. 6 to a vertical stowed position of FIG. 7 in which the keyboard 16 faces inwardly and thereby protected inside the housing 12.

Figure 8:
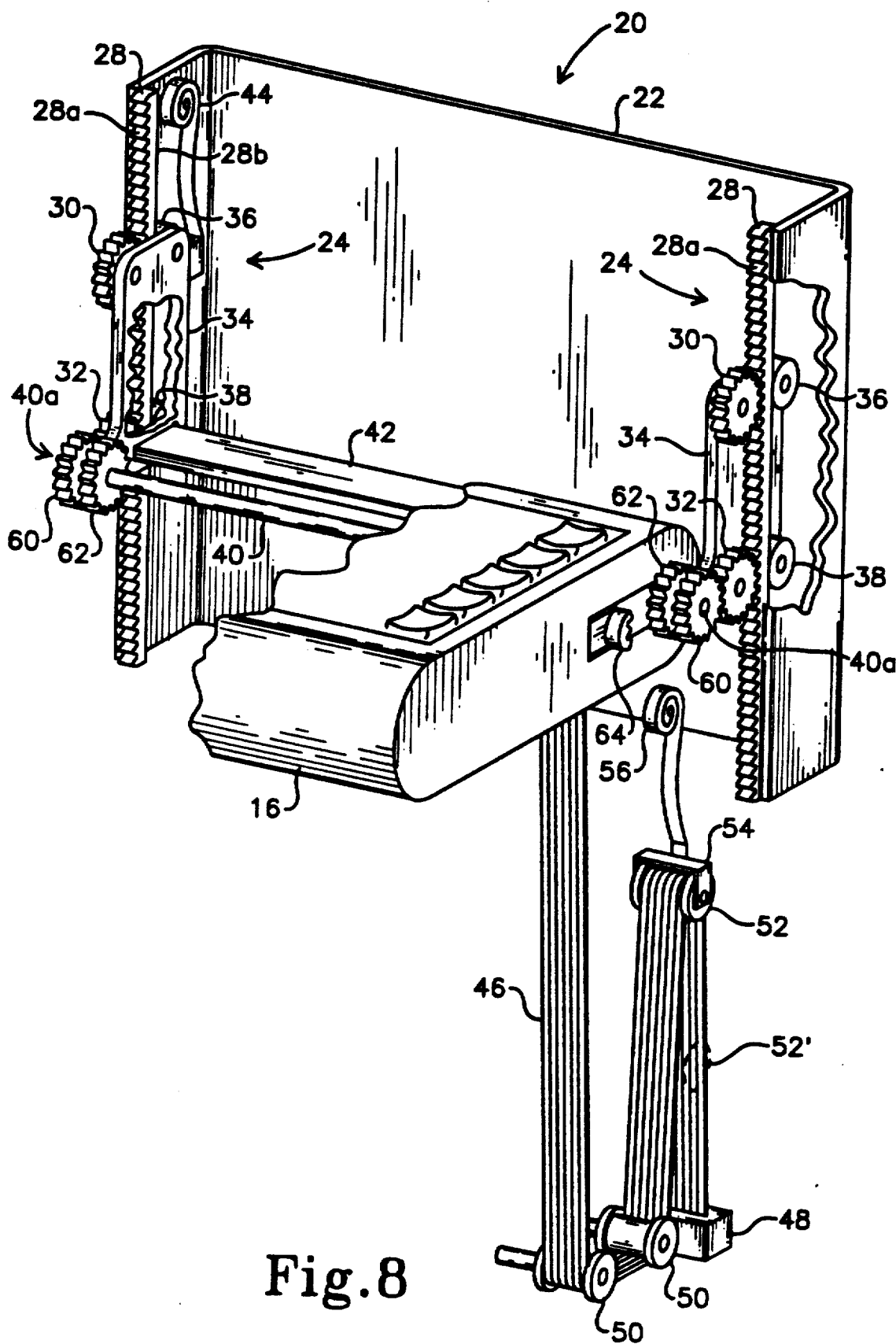
FIG. 8 is a partial perspective view, partially cut away, illustrating a mechanism embodying the present invention which extends from the frame for supporting the keyboard in the various positions.

A mechanism 20 embodying the present invention which enables the keyboard 16 to be rotated to the positions of FIGS. 1 to 7 and intermediate positions therebetween is illustrated in FIG. 8. In addition to its primary application in the computer terminal 10, the mechanism 20 can be used for supporting objects other than keyboards for rotational movement about an axis which is transversely movable in a direction perpendicular to itself.

The mechanism 20 includes a generally U-shaped chassis or frame 22 which is fixed inside the housing 12. Two symmetrical guide units 24 extend from side walls of the frame 22 for supporting the keyboard 16. Each of the units 24 includes a rack 28 which is fixed to the respective side wall, and two pinion gears 30 and 32 which mesh with a toothed surface 28a of the rack 28. The racks 28 extend in a direction, in the illustrated example, vertical, in which transverse movement of the keyboard 16 is desired.

The pinion gears 30 and 32 are rotatably mounted on and support side plates or carriers 34, and are maintained in mesh with the toothed surface 28a by means of rollers 36 and 38 which are rotatably mounted on the carriers 34 and engage with back surfaces 28b of the racks 28. The spacing between the gears 30 and 32 and the rollers 36 and 38 is adjusted such that the rack 28 will be clamped therebetween with sufficient force to maintain the gears 30 and 32 in mesh with the toothed surface 28a with minimum backlash, but not with excessive force which would create rolling resistance.

Although two rollers 36 and 38 are illustrated as being vertically aligned with the respective gears 30 and 32, the invention can be practiced using a single roller which is spaced between the gears 30 and 31. It is also possible to provide three or more rollers, or replace the rollers 36 and 38 with a low friction slider of the like (not shown).

The mechanism 20 further includes a shaft 40 which extends through and rotatably supports the upper edge portion of the keyboard 16. Opposite end portions 40a of the shaft 40 protrude from the lateral sides of the keyboard 16, and are rotatably supported by the respective carriers 34. The keyboard 16 is thereby supported for rotational movement about the axis of the shaft 40 by the guide units 24.

The racks 28 and pinion gears 30 and 32 in combination with the rollers 36 and 38 enable the carriers 34 and thereby the shaft 40 and keyboard 16 to move vertically. The shaft 40 is rotatable about its own axis, and the axis of the shaft 40 is also movable transversely (vertically) perpendicular to itself. These two degrees of freedom enable the keyboard 16 to be moved to all of the positions illustrated in FIGS. 1 to 7 and the intermediate positions therebetween.

The engagement of the pinion gears 30 and 32 with the racks 28 positively prevents skewing (one end being higher than the other end) of the keyboard 16, since the two gears 30 and 32 are spaced from each other in the direction of desired transverse movement. The rollers 36 and 38 maintain the gears 30 and 32 in mesh with the toothed surface 28a, and prevent forward and backward tilting of the carriers 34. Thus, guide means 24 move the keyboard 16 straight up and down.

In order to yet further increase the positional integrity of the guide units 24, a rigid spacer bar 42 is fixed at its ends to the carriers 34 to positively maintain the required spacing therebetween. Further illustrated are constant force springs 44 (only one is visible in the drawing) which are connected between the frame 22 and carriers 34 and act as counterbalances.

The force of the springs 44 is selected to equal the combined weight of the keyboard 16, shaft 40, gears 30 and 32, carriers 34, rollers 36 and 38 and a locking arrangement which will be described below so that the movement of the keyboard 16 will not be resisted by gravity with the terminal 10 oriented vertically. The springs 44 are also known as "negator" springs, and are commercially available, for example, from John Evans Sons', Inc. of Philadelphia, Pa.

An arrangement is also provided for taking up the slack in a flat, electrical connector cable 46 which extends from the keyboard 16 to a connector block 48 for connection of the keyboard 16 to the other electronic components of the terminal 10. The cable 46 is trained around fixed flanged rollers 50 and a movable flanged roller 52. A yoke 54 rotatably supports the roller 52. A spring 56 is connected between the frame 22 and yoke 54 for applying a constant or variable upward force to the roller 52.

Upward movement of the keyboard 16 causes the roller 52 to move downwardly from the solid line position toward a broken line position designated as 52', and vice-versa. The spring 56 takes up the slack in the cable 46 and prevents tangling thereof in all positions of the keyboard 16.

Figure 9:
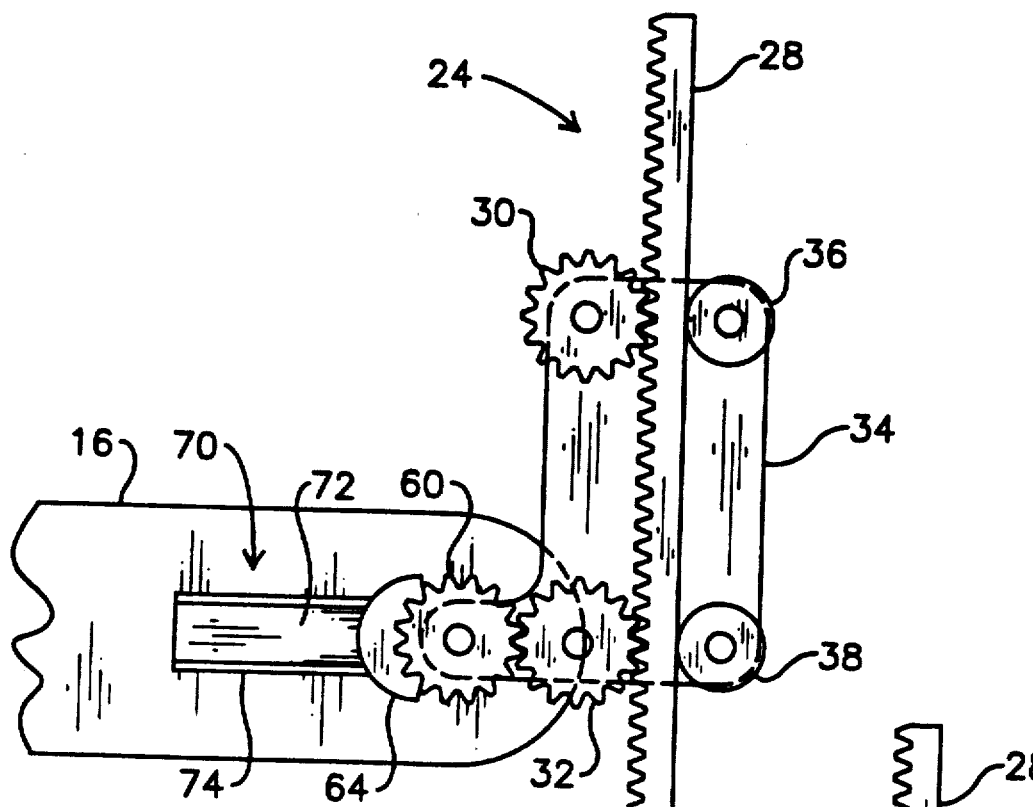
FIGS. 9 and 10 are partial side elevational views illustrating the mechanism in locked and unlocked positions respectively.
Figure 10:
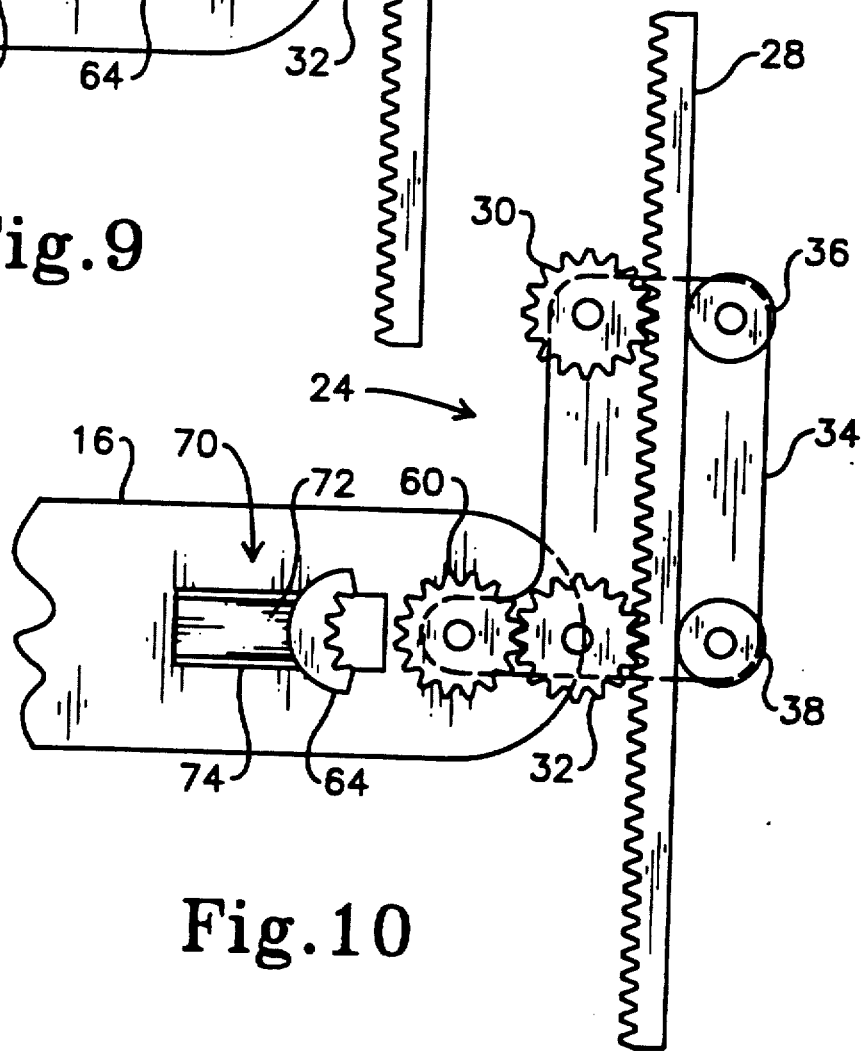

With reference also being made to FIGS. 9 and 10, the mechanism 20 further includes an arrangement for locking the keyboard 16 in a desired transverse and rotational position. Transverse locking gears 60 are keyed or otherwise fixed to the end portions 40a of the shaft 40, and rotational locking gears 62 are fixed by screws (not shown) to the carriers 34 adjacent to the respective gears 60. The end portions 40a of the shaft 40 coaxially and rotatably extend through the gears 62. The gears 60 mesh with the pinion gears 32. The gears 60 and 62 have the same number of teeth.

Toothed locking members 64 extend from the keyboard 16 and are movable into and out of meshing engagement with the gears 60 and 62. More specifically, a locking member 64 is provided on each side of the keyboard 16, and is engagable with both of the gears 60 and 62 on the respective side. As illustrated in FIG. 9, the locking members 64 are engaged with the respective gears 60 and 62. As illustrated in FIG. 10, the locking members 64 are disengaged from the gears 60 and 62.

When the looking members 64 are disengaged from the gears 60 and 62, the keyboard 16 can be moved vertically and rotated as described above to a desired position. When the locking members 64 are engaged with the gears 60 and 62, the keyboard 16 is locked in the desired position.

The locking members 64 rotate integrally with the keyboard 16 about the axis of the shaft 40. Engagement of the locking members 64 with the rotational locking gears 62 causes the shaft 40 to be locked to the carriers 34 and thereby and prevented from rotating.

Engagement of the locking members 64 with both of the gears 60 and 62 causes the gears 60 and 62 to be locked together. Since the gears 62 cannot rotate and the gears 60 are prevented from rotating, the pinion gears 32 which mesh with the gears 60 cannot rotate either. Since the pinion gears 32 cannot rotate, the carriers 34 are prevented from transverse (vertical) movement. In this manner, the keyboard 16 is locked to the carriers 34 which are in turn locked to the frame 22 by the locking members 64, gears 60 and 62 and pinions 32.

The locking members 64 can each have only one tooth, but preferably have a plurality of teeth which mesh smoothly with the teeth of the gears 60 and 62. As will be described below, the locking members 64 are preferably spring loaded toward engagement with the gears 60 and 62. Thus, with a rotational force applied to the keyboard 16 in excess of the spring force, the locking members 64 are able to move away from the gears 60 and 64 and enable the keyboard 16 to break away and rotate to prevent damage to the locking mechanism due to excessive application of force to the keyboard 16. Thus, the mechanism 20 is provided with an overload breakaway function.

The number of incremental rotational positions at which the keyboard 16 can be locked is equal to the number of teeth on the gears 60 and 62. For example, sixteen teeth provide 360°/16=22.50 increments. The gears 60 and 62 preferably have the same diameter, although it is within the scope of the invention for the gears 60 and 62 to have different diameters and the locking members 64 provided with stepped portions (not shown) which Correspond to the different diameters.

The locking arrangement is illustrated in FIG. 11, and includes latch members 70, one of which is illustrated in FIG. 12. The latch members 70 include thin bars 72, with the locking members 64 being fixed to the upper ends of the bars 72. Slots 74 are formed through the lower end portions of the bars 72.

As viewed in FIG. 11, the bars 72 of the latch members 70 are slidably movable in slots 76 formed along the sides of the keyboard 16. The bars 72 are retained in the slots 76 by cover plates 78. The locking members 64 extend external of the slots 76 and keyboard 16 for engagement with the gears 60 and 62.

The locking arrangement further includes rocker links 80 and 82 which are pivotal about pins 84 and 86 respectively. The links 80 and 82 have tabs 80a and 82a at their outer ends which fit in the slots 74 of the respective latch members 70. Tension springs 88 and 90 urge the outer ends of the links 80 and 82 and thereby the respective latch members 70 upwardly toward the gears 60 and 62.

The inner end of the link 80 is formed with a single tooth 80b, which fits between two teeth 82b formed in the inner end of the link 82. The teeth 80b and 82b are preferably profiled as gear teeth for smooth meshing engagement upon rotation of the links 80 and 82. A button 92 is loosely fit onto tabs 80c and 82c of the links 80 and 82, and slidably retained in a hole 16a in the lower edge of the keyboard 16.

With the button 92 released, the links 80 and 82 are urged clockwise and counterclockwise by the springs 88 and 90 respectively, and the locking members 70 are moved into locking engagement with the gears 60 and 62. When the button 92 is depressed, the links 80 and 82 are rotated counterclockwise and clockwise respectively, thereby moving the locking members 70 away from the gears 60 and 62 and enabling the keyboard 16 to be moved to a desired transverse and rotational position.

While an illustrative embodiment of the invention has been shown and described, numerous variations and alternate embodiments will occur to those skilled in the art, without departing from the spirit and scope of the invention.

Accordingly, it is intended that the present invention not be limited solely to the specifically described illustrative embodiment. Various modifications are contemplated and can be made without departing from the spirit and scope of the invention as defined by the appended claims.

We claim:

1. A computer terminal, comprising:
   a frame;
   a keyboard; and
   support means for supporting the keyboard for movement relative to the frame including rotational movement about an axis which is transversely movable in a direction perpendicular to itself; including:
   a shaft which rotatably supports the keyboard coaxially with said axis and has opposite end portions which extend from the keyboard; and
   a pair of guide units for rotatably supporting and guiding said end portions of the shaft respectively for transverse movement in said direction, each of the guide units including:
   a rack which extends in said direction and has a toothed surface;
   two pinion gears which are spaced from each other in said direction and mesh with said toothed surface of the rack;
   a carrier which is rotatably supported by the pinion gears and rotatably supports one of said end portions of the shaft; and
   a gear which is fixed to said one of said end portions of the shaft end meshes with one of said pinion gears.

2. A terminal as in claim 1, in which the support means comprises locking means for locking the keyboard in a selected rotational and transverse position.

3. A terminal as in claim 1, in which the shaft extends through the keyboard.

4. A terminal as in claim 1, in which the shaft extends adjacent to an upper edge of the keyboard.

5. A terminal as in claim 1, further comprising counterbalance means for applying a force to the carriers which counterbalances the weight of the keyboard, shaft, carriers and pinion gears.

6. A terminal as in claim 5, in which the counterbalance means comprises constant force spring means connected between the frame and the carriers.

7. A terminal as in claim 1, in which each of the guide units further comprises retaining means for maintaining the pinion gears in mesh with said toothed surface of the rack.

8. A terminal as in claim 7, in which the retaining means comprises a roller which is rotatably supported by the carrier and rollingly engages with a surface of the rack which is opposite to said toothed surface thereof.

9. A computer terminal, comprising:
   a frame;
   a keyboard;
   support means for supporting the keyboard for movement relative to the frame including rotational movement about an axis which is transversely movable in a direction perpendicular to itself; including:
   a shaft which rotatably supports the keyboard coaxially with said axis and has opposite end portions which extend from the keyboard; and
   a pair of guide units for rotatably supporting and guiding said end portions of the shaft respectively for transverse movement in said direction, each of the guide units including:
   a rack which extends in said direction and has a toothed surface;
   two pinion gears which are spaced from each other in said direction and mesh with said toothed surface of the rack;
   a carrier which is rotatably supported by the pinion gears and rotatably supports one of said end portions of the shaft; and
   locking means for locking the keyboard in a selected rotational and transverse position, including:
   a pair of rotational locking gears which are fixed to said end portions of the shaft and mesh with one of said pinion gears of the guide units respectively;
   a pair of transverse locking gears which are fixed to the carriers of the guide units adjacent to the rotational locking gears coaxially with said end portions of the shaft respectively; and
   a pair of toothed locking members which extend from the keyboard adjacent to said end portions of the shaft and are movable into and out of mesh with both of said rotational and transverse locking gears respectively.

10. A terminal as in claim 9, in which the locking members comprise internal gear segments.

11. A terminal as in claim 10, further comprising biasing means for releasably urging the gear segments into mesh with said adjacent rotational and transverse locking gears respectively.

12. A terminal as in claim 9, in which said end portions of the shaft rotatably extend through said transverse locking gears respectively.

13. A mechanism for supporting a object for movement relative to a structure including rotational movement about an axis which is transversely movable in a direction perpendicular to itself, comprising:
- a shaft which rotatably supports the object coaxially with said axis and has opposite end portions which extend from the object; and
- a pair of guide units for rotatably supporting and guiding said end portions of the shaft respectively for transverse movement in said direction, each of the guide units including:
  - a rack which extends in said direction and has a toothed surface;
  - two pinion gears which are spaced from each other in said direction and mesh with said toothed surface of the rack;
  - a carrier which is rotatably supported by the pinion gears and rotatably supports one of said end portions of the shaft; and
  - a gear which is fixed to said one of said end portions of the shaft and meshes with one of said pinion gears.

14. A mechanism as in claim 13, in which each of the guide units further comprises retaining means for maintaining the pinion gears in mesh with said toothed surface of the rack.

15. A mechanism as in claim 14, in which the retaining means comprises a roller which is rotatably supported by the carrier and rollingly engages with a surface of the rack which is opposite to said toothed surface thereof.

16. A mechanism as in claim 13, further comprising locking mean for locking the object in a selected rotational and transverse position.

17. A mechanism for supporting an object for movement relative to a structure including rotational movement about an axis which is transversely movable in a direction perpendicular to itself, comprising:
- a shaft which rotatably supports the object coaxially with said axis and has opposite end portions which extend from the object;
- a pair of guide units for rotatably supporting and guiding said end portions of the shaft respectively for transverse movement in said direction, each of the guide units including:
  - a rack which extends in said direction and has a toothed surface;
  - two pinion gears which are spaced from each other in said direction and mesh with said toothed surface of the rack;
  - a carrier which is rotatably supported by the pinion gears and rotatably supports one of said end portions of the shaft; and
- locking means for locking the object in a selected rotational and transverse position, including:
  - a pair of rotational locking gears which are fixed to said end portions of the shaft and mesh with one of said pinion gears of the guide units respectively;
  - a pair of transverse locking gears which are fixed to the carriers of the guide units adjacent to the rotational locking gears coaxially with said end portions of the shaft respectively; and
  - a pair of toothed locking members which extend from the object adjacent to said end portions of the shaft and are movable into and out of mesh with both of said rotational and transverse locking gears respectively.

18. A mechanism as in claim 17, in which the locking members comprise internal gear segments.

19. A mechanism as in claim 10, further comprising biasing means for releasably urging the gear segments into mesh with said rotational and transverse locking gears respectively.

* * * * *